June 11, 1957 W. KUNIK 2,795,348
SEALABLE CONTAINER AND METHOD AND APPARATUS
FOR SEALING THE CONTAINER
Filed June 12, 1953
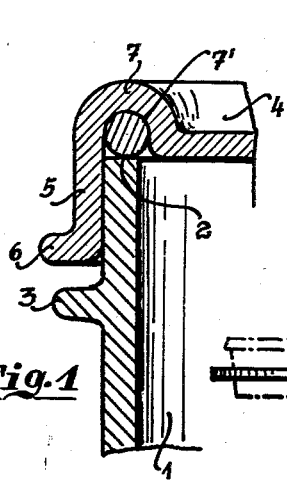
Fig. 1
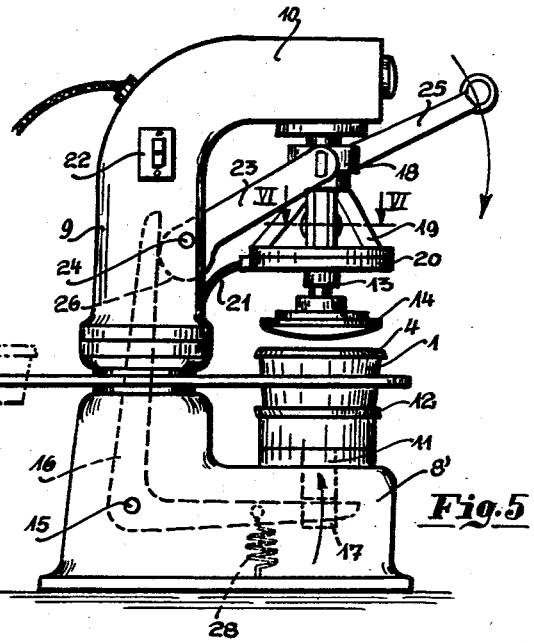
Fig. 5
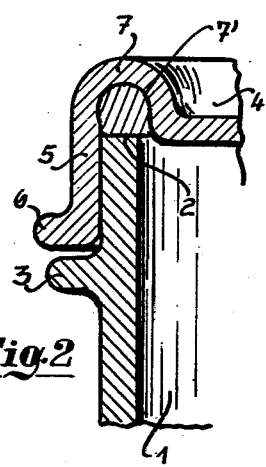
Fig. 2
Fig. 3
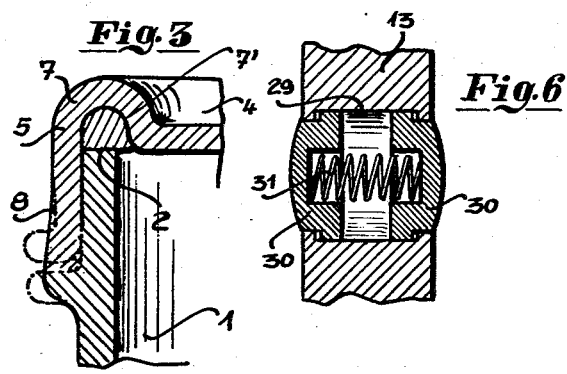
Fig. 6
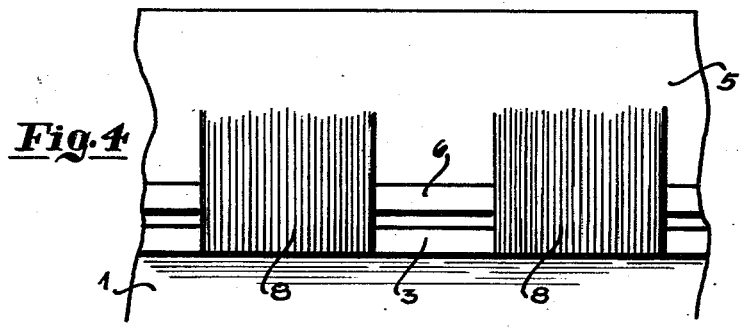
Fig. 4

United States Patent Office 2,795,348
Patented June 11, 1957

2,795,348

SEALABLE CONTAINER AND METHOD AND APPARATUS FOR SEALING THE CONTAINER

Walter Kunik, Frankfurt am Main, Germany

Application June 12, 1953, Serial No. 361,305

Claims priority, application Germany July 23, 1952

14 Claims. (Cl. 220—27)

The present invention relates to sealable containers of thermoplastic material, processes of sealing such containers and devices for carrying out the process.

To obtain a tight fit of a flanged cover on cans or similar containers of thermoplastic synthetics, for instance of polystyrenes, it is known to make the inside diameter of the skirt wall of the cover slightly smaller than the outside diameter of the can and to arch the cover slightly upwardly, so that when pressure is applied on the arched part of the cover, the skirt wall is slightly increased in diameter and can then be slid over the edge of the can. Upon release of the cover, the skirt wall attempts to resume its initial shape, whereby the inner periphery of the skirt wall of the cover is pressed firmly against the wall of the can. While in this manner a relatively tight seal can be achieved, it is not sufficient for the requirements of the canning industry or for other packaging purposes where it is important to have a seal which is not only tight but protected against accidental loosening. For this reason it has been proposed to glue the cover to the can by means of a solvent for the respective plastic or to weld the two parts together by heating. The cover is thereby additionally secured on the container, but this measure also is unsuitable for use in such branches of industry in which the material placed in the sealed container must be further subjected to a heat treatment because this gluing or welding, if carried out around the entire skirt wall, does not permit the escape of air or liquid from the can during heating. Welding or gluing at individual points of the skirt wall only cannot prevent intake of air into the can after cooling even with the best clamping fit of the cover.

The present invention relates to a new design of the seal of a container sealable by a flanged cover, in particular of a canning container, which in the sealed state is absolutely tight, with a safe union of the cover with the container, while preventing the retention of positive pressure in the sealed container upon its being heated. The invention further relates to a new process for the sealing of these containers as well as an apparatus intended for carrying the same into effect.

According to the present invention, the seal in a container of thermoplastic material sealable by a cover having a skirt wall is produced in that the cover, a packing ring having been first placed on the edge of the container, is placed on the packing ring and the skirt wall of the cover is welded to the container at spaced points. Thus, as ordinarily in canning containers or jars, sealing is accomplished by the rubber ring and by the reduced pressure prevailing in the sealed container after it has been heated, while the welding constitutes the securing of the seal. As the welding is limited to spaced points of the skirt wall, the excess pressure can escape to the outside when the sealed container is heated, and the reduced pressure prevailing in the container after cooling causes additional sealing.

Preferably the height of the skirt wall of the cover should be so dimensioned that its lower edge remains in the sealing position at a small distance from the beaded edge of the container, to facilitate the introduction of a tool to open the container, for instance a knife.

For sealing, the cover is pressed onto the container with a certain pressure, whereupon the welding of the skirt wall is effected.

The new design of the seal, the manner of its production, and a corresponding sealing machine are described more fully below with reference to the accompanying drawing, in which:

Figs. 1–3 show in section the cover loosely placed on the container, the cover pressed on, and the finished seal, respectively;

Fig. 4 shows a side view of the seal;

Fig. 5 a side view of the sealing apparatus; and

Fig. 6 a detail view of a portion of Fig. 5 on the line VI—VI.

Container 1, otherwise of any desired design, is provided about its outer periphery at some distance from the upper edge 2 with a bead 3 extending continuously all around. The container is made of a thermoplastic material, for instance of polystyrene. Cover 4 has a top wall 4a and a skirt wall 5 with a bottom edge bead 6. At the junction of the top wall 4a and the skirt wall 5 there is an inwardly opening groove 7 for receiving a packing ring 7'. The height of the skirt wall 5 in relation to the height of the container wall standing above the bead 3 of the container is so dimensioned that when the bead 6 nearly engages the bead 3, as shown in Fig. 2, the packing ring 7' is clamped between the edge 2 of the container and the cover 4.

To produce the seal, the cover is placed on the container and is then pushed down until, with the packing ring being pressed in, the beaded edge 6 nearly rests on the bead 3. By heating of the material at spaced points 8 along the beads 3 and 6, the latter are superficially welded together, so that after cooling the cover 4 is firmly held on the container 1 with clamping of the packing ring 7'.

Upon heating of the container thus sealed, therefore, the excess pressure produced in the container can escape from between the beads 3 and 6 between the weld points 8.

The device for welding together the spaced points of the beads 3 and 6 includes, according to Figs. 5 and 6, a hollow base member 8' with upright arm 9 and head 10 supported by the arm 9 and overhanging the base member 8'. In a guide of the base member 8', a piston 11, presenting a receiving plate or clamping member 12 for the container to be sealed, is guided for vertical displacement. From the head 10, aligned with the piston 11, there extends toward the latter a guide bar 13 on which is stationarily mounted at the lower edge an abutment plate or clamping member 14. The abutment plate 14 is aligned with the cover 4 of the container to be sealed.

A bell crank 16 is pivotally supported at the junction of its arms on a cross pin 15 carried by the base plate 8'. One arm of the bell crank 16 engages in a slot 17 of the piston 11.

On the guide bar 13, there is slidably supported a ring 18 upon which a heating and sealing ring 20 is mounted by arms 19 which extend downward and outward. The heating ring 20, in which a resistance coil is mounted, is connectable to a source of current by means of an electric cord 21 through a switch 22 mounted on the arm 9. Thus, the heating ring 20 can be energized to effect softening of the thermoplastic material of the container and of the cover. At the inside diameter, which approximately corresponds to the outside diameter of the skirt wall 5 of the cover of the container to be sealed, the heating ring 20 is provided with a number of equally spaced, inwardly extended projections, whose inner diameter is somewhat smaller than the outside diameter of the beads 3 and 6 or respectively of the skirt wall 5 of the cover.

By means of a pin-and-slot connection, the heating ring 20 is coupled with an arm 23 which is pivotally supported on a pin 24 carried by the arm 9. A hand lever 25 is provided for sliding the ring 18 and the heating ring 20 downward on the guide bar 13 and for pivoting the arm 23.

The inner end of the arm 23 has a cam 26, engaged by the other free arm of the bell crank 16. A spring 28 connected to the bell crank 16 holds the upstanding free arm of the bell crank in contact with the cam 26.

The guide bar 13 is provided with a cross bore 29, see Fig. 6, in which are mounted two opposed detents 30 which are held in extended position by a spring 31 in which they protrude beyond the outer surface of bar 13 and thus form a noticeable but passable resistance for the ring 18.

The contour of the cam 26 and location of the detents 30 are such that in the movement of the ring 18 above the detents 30 the cam 26 will exert an actuating force on the bell crank lever 16, while in the movement of the ring 18 below the detents 30 the ring 18 and the heating ring 20 supported by it are moved further downward on the bar 13 and the cam 26 continues to turn without affecting the position of bell crank lever 16.

This results in the following method of operation for the device: In the inoperative position of the parts, a container with flanged cover is placed on the plate 12 of piston 11. Hand lever 25 is then pulled down. Thereby the bell crank 16 is turned by the cam 26 and lifts the piston 11 with the plate 12 so that the container with the cover is clamped between plates 12 and 14. The cover 4 is thus applied on the container 1, the packing ring 7' being squeezed in position between the edge 2 and the walls of the groove 7.

Upon further downward movement of the hand lever 25, the plates 12, 14 remain in the tensioned position, and now the heating ring 20 is lowered over the skirt wall 5 and the beads 3 and 6. The projections provided on the inner periphery of the heating ring 20 engage the outer side of the skirt wall 5 and the beads 6 and 3, softening them at spaced points, so that a surface welding between the cover and the beaded edge 3 of the container occurs at these points.

As the hand lever 25 is released, it is held in an intermediate position by the detents 30, in which position the heating ring 20 is removed from the container, while the container is still under the compressive pressure of the plates 12, 14. By this retention of the parts in the intermediate position, the operator is reminded to delay the return of the lever 25 to its starting position in a single motion, and so the softened material is given time to anchor the cover firmly to the container by solidification.

Cam 26 may be adjustable on the pin 24, to be able to adjust the pressure applied to the cover. To accelerate the operation, the arm 9 and base member 8' has a rotary disk or plate associated with it, provided with holes for receiving the containers to be sealed. Also the hand lever 25 and the rotary disk may be controlled by a powered drive which automatically regulates the succession of the individual movements.

Having thus described my invention, what I claim as new and desire to secure by United States Letters Patent is:

1. A food container, comprising a transparent container body of thermoplastic material having an open top and an outer circumferential bead spaced below said open top, a cover of the thermoplastic material having a top wall and a depending skirt wall surrounding said body above said bead, a resilient packing ring arranged in said cover at the junction of said top wall and said skirt wall and seated on the top edges of said body, and a bead on the bottom edge of said skirt wall, said beads being integrated to one another only at spaced points holding said cover in position on said body and said packing ring in sealing position on the top edges of said body.

2. A container according to claim 1, including an inwardly opening groove in said cover at the junction of said top wall and said skirt wall in which said packing ring is mounted.

3. A container according to claim 1, wherein said skirt wall is of a depth greater than the space between the bead of said body and its top edge by an amount less than the thickness of said packing ring so that said cover may be pressed down on said body compressing said packing ring in sealing position and bringing said beads into close proximity to one another.

4. A process for sealing a food container, consisting in placing a resilient packing ring in a cover of thermoplastic material at the junction of its top and skirt walls, placing the cover of thermoplastic material in position on the open top of a container body with the resilient packing ring engaging the top edges of the container body and with a bead on the bottom edge of the skirt wall facing a complementary bead on said body below said skirt wall, and applying heat to said beads at spaced points to soften and fuse the material thereof to secure said cover in position on said container body.

5. A process according to claim 4, consisting in applying pressure to said cover to press it into position on said body prior to heating to squeeze said resilient packing ring in sealing position, and maintaining said pressure during said heating step.

6. A process according to claim 5, consisting in maintaining said pressure for a time following completion of the heating step to allow the fused points to cool and harden.

7. A process according to claim 5, wherein the pressure is applied to squeeze said resilient packing ring but leave a slight space between said beads.

8. Apparatus for sealing together adjacent beads of a container body and a complementary cover made of a thermoplastic material, comprising a frame, clamp members arranged above one another on said frame for supporting the container body and cover and being movable toward each other to compress said cover in position on said container body, and a sealing ring on said frame lowerable onto the top portion of said body and said cover and having a heating element for softening and fusing said beads, said sealing ring having inwardly extended, spaced projections on its inner periphery for heating and sealing spaced points about the peripheries of said beads.

9. Apparatus according to claim 8, including a vertically arranged bar supported by said frame, said upper clamp member being stationarily mounted on the lower end of said bar, said sealing ring being slidably supported on said bar for downward movement, said lower clamp member being mounted on a movable piston for movement toward said stationary upper clamp member.

10. Apparatus according to claim 9, including a bell crank pivotally supported on said frame and having an arm connected with said piston to raise said piston and said lower clamp member when said bell crank is pivoted, an arm pivotally mounted on said frame and connected to said sealing ring to be pivoted when said sealing ring is lowered, and a cam on said arm and engaged with the other arm of said bell crank lever for pivoting said bell crank when said arm is pivoted.

11. Apparatus according to claim 10, including a hand lever connected to said sealing ring for lowering said sealing ring on said bar.

12. Apparatus according to claim 10, including at least one spring pressed detent beneath which the sealing ring must be lowered along its path of downward movement toward effective sealing position.

13. Apparatus according to claim 8, including a rotary plate mounted on said frame in a plane between said clamping members for carrying said bodies and covers into position between said clamping members.

14. Apparatus according to claim 13, wherein said rotary plate has openings for receiving said container bodies.

References Cited in the file of this patent

UNITED STATES PATENTS

| | | |
|---|---|---|
| 668,691 | Rudd | Feb. 26, 1901 |
| 842,831 | Eagelman | Jan. 29, 1907 |
| 1,088,133 | Eichhorn | Feb. 24, 1914 |
| 1,603,330 | Dister | Oct. 19, 1926 |
| 2,072,149 | Young | Mar. 2, 1937 |
| 2,375,386 | Rick | May 8, 1945 |
| 2,423,965 | Coyle | July 15, 1947 |
| 2,425,388 | Oestricher | Aug. 12, 1947 |
| 2,462,988 | Mongan | Mar. 1, 1949 |
| 2,588,604 | Archer | Mar. 11, 1952 |
| 2,638,964 | Andina | May 19, 1953 |
| 2,642,911 | De Shazor | June 23, 1953 |
| 2,645,591 | Makrauer | July 14, 1953 |

FOREIGN PATENTS

| | | |
|---|---|---|
| 561,393 | Great Britain | May 18, 1944 |